United States Patent
Mody et al.

(10) Patent No.: US 8,270,735 B2
(45) Date of Patent: Sep. 18, 2012

(54) SHARED ERROR RESILIENCY PATH THROUGH COEFFICIENT REORDERING

(75) Inventors: Mihir Narendra Mody, Pune (IN); Kumar Arrakutti Desappan, Ekambara Kuppam (IN)

(73) Assignee: Texas Instruments Incorporated, Dallas, TX (US)

(*) Notice: Subject to any disclaimer, the term of this patent is extended or adjusted under 35 U.S.C. 154(b) by 1018 days.

(21) Appl. No.: 12/058,775

(22) Filed: Mar. 31, 2008

(65) Prior Publication Data

US 2009/0245673 A1    Oct. 1, 2009

(51) Int. Cl.
*G06K 9/36* (2006.01)
(52) U.S. Cl. ........................................ 382/232
(58) Field of Classification Search .......... 382/232, 382/238–240, 248–252; 375/240.02–240.03, 375/240.1, 240.12, 240.18, 240.2, 240.27; 348/394.1–395.1, 397.1–398.1, 403.1–404.1, 348/408.1–412.1, 415.1, 424.2, 425.2
See application file for complete search history.

(56) References Cited

U.S. PATENT DOCUMENTS

| | | | |
|---|---|---|---|
| 6,771,703 B1 * | 8/2004 | Oguz et al. | 375/240.03 |
| 7,010,037 B2 * | 3/2006 | Ye et al. | 375/240.1 |
| 7,042,941 B1 * | 5/2006 | Laksono et al. | 375/240.03 |

* cited by examiner

*Primary Examiner* — Jose Couso
(74) *Attorney, Agent, or Firm* — John R. Pessetto; W. James Brady; Frederick J. Telecky, Jr.

(57) ABSTRACT

The method, system, and apparatus of a shared error resiliency path through coefficient reordering is disclosed. In on embodiment, determining that an input data is data-partitioned, performing a discrete cosine transform and a quantization of the input data to form a quantized data, separating a first coefficient representing a DC coefficient of the quantized data for each block of the input data, rearranging other coefficients representing AC coefficients of the quantized data for each block of the input data in a fashion produces a zig-zag scan output similar to that of a non-data-partitioned data, bypassing a DC encoding module, determining whether any of the rearranged AC coefficients of the quantized data need to be encoded, performing a zig-zag scan on the rearranged AC coefficients of the quantized data when they need to be encoded, and encoding the rearranged AC coefficients of the quantized data based on the zig-zag scan.

17 Claims, 11 Drawing Sheets

FIG. 5

STANDARD ZIG-ZAG SCAN 502

```
23—12   04—11   15—00   10—01
08   00   16   00   12   00   00   07
16   04   00   03   00   06   08   00
05   11   04   06   00   02   01   00
00   01   10   00   01   00   01   04
13   00   09   01   01   01   00   00
16   06   01   01   00   02   00   00
02—04   00—06   00—00   03—00
```

GENERAL SEQUENCE:
23, 12, 08, 16, 00, 04, 11, 16, 04, 05, 00, 11, 00, 09, 15, 00, 12, 03, 04, 01, 13, 16, 00, 10, 06, 00, 00, 10, 01, 00, 06, 00, 00, 09, 06, 02, 04, 01, 01, 01, 02, 08, 07, 00, 01, 00, 01, 01, 00, 06, 00, 01, 01, 00, 04, 00, 02, 00, 00, 00, 00, 00, 03, 00

504 CORRECTED ZIG-ZAG SCAN FOR CHANGED SEQUENCE

```
12—08   11—16   00—12   01—00
16   04   04   15   03   10   06   00
00   05   00   04   00   00   07   01
00   00   01   00   00   08   00   04
11   13   06   09   02   01   00   00
16   10   06   01   01   01   02   00
00   02   01   00   01   00   00   03
04—01   06—00   00—00   00—00
```

CORRECTED SEQUENCE:
12, 08, 16, 00, 04, 11, 16, 04, 05, 00, 11, 00, 09, 15, 00, 12, 03, 04, 01, 13, 16, 00, 10, 06, 00, 00, 10, 01, 00, 06, 00, 00, 09, 06, 02, 04, 01, 01, 01, 02, 08, 07, 00, 01, 00, 01, 01, 00, 06, 00, 01, 01, 00, 04, 00, 02, 00, 00, 00, 00, 00, 03, 00, 00

550 EXAMPLE OF ZIG-ZAG CORRECTION

ZIG ZAG
DECODE TABLE
750

ZIG-ZAG_INVERSE
TABLE
702

ZIGZAG_INVERSE [64]=
{
XX, 0,  9,  2, 11,  4, 13,  6,
1,  16,  3, 18,  5, 20,  7, 22,
8,  10, 25, 12, 27, 14, 29, 15,
17, 32, 19, 34, 21, 36, 23, 38,
24, 26, 41, 28, 43, 30, 45, 31,
33, 48, 35, 50, 37, 52, 39, 54,
40, 42, 57, 44, 59, 46, 61, 47,
49, 56, 51, 58, 53, 60, 55, 62
};

ZIG-ZAG_HORIZONTAL
_INVERSE TABLE
704

ZIGZAG_HORIZONTAL_INVERSE [64]=
{
XX, 0,  1,  2, 11,  4,  5,  6,
3,   8, 17, 10, 13, 14, 15, 7,
9,  16, 19, 12, 27, 20, 21, 22,
18, 24, 33, 26, 23, 28, 29, 30,
25, 32, 31, 34, 43, 36, 37, 38,
35, 40, 49, 42, 39, 44, 45, 46,
41, 48, 47, 50, 59, 52, 53, 54,
51, 56, 57, 58, 55, 60, 61, 62
};

706
ZIG-ZAG_VERTICAL
_INVERSE TABLE

ZIGZAG_VERTICAL_INVERSE [64]=
{
XX, 24,  9, 18, 11, 28, 13, 30,
0,   1,  2,  3,  4,  5,  6,  7,
8,  10, 26, 12, 59, 14, 61, 15,
16, 17, 33, 19, 20, 21, 22, 23,
25, 41, 27, 58, 29, 60, 31, 62,
32, 49, 34, 35, 36, 37, 38, 39,
40, 57, 42, 43, 44, 45, 46, 47,
48, 56, 50, 51, 52, 53, 54, 55
};

FIG. 7

SHARED ERROR RESILIENCY PATH THROUGH COEFFICIENT REORDERING

FIELD OF TECHNOLOGY

This disclosure relates generally to compression of video data, a technical field of software and/or hardware technology and, in one example embodiment, to a system, method, and apparatus of a shared error resiliency path through coefficient reordering.

BACKGROUND

Certain video compression standards may provide error resiliency options to minimize quality degradation during transmission of video data. For example, MPEG-4 (e.g., a collection of methods defining compression of video data) may include a data partitioning option. The data partitioning option may segregate bit-streams in various classes with varying priority so that high priority portions of a bit stream are sent over a more reliable network to reduce impact of bit-stream errors. Additional circuitry (and/or software code) may be required to encode and decode video data when the data partitioning option is employed. This may increase time needed to test and verify each circuit. Furthermore, the additional circuitry may increase cost, size, and complexity of a design.

SUMMARY

The method, system, and apparatus of a shared error resiliency path through coefficient reordering is disclosed. In one aspect, a method includes determining that an input data is to be data-partitioned, performing a discrete cosine transform and a quantization of the input data to form a quantized data, separating a first coefficient representing a DC coefficient of the quantized data for each block of the input data, rearranging other coefficients representing AC coefficients of the quantized data for each block of the input data in a fashion produces a zig-zag scan (e.g., the zig-zag scan may use one of a standard zig-zag table, a horizontal zig-zag table, and/or a vertical zig-zag table) output similar to that of a non-data-partitioned data, bypassing a DC encoding module, determining whether any of the rearranged AC coefficients of the quantized data need to be encoded, performing a zig-zag scan on the rearranged AC coefficients of the quantized data when they need to be encoded and encoding the rearranged AC coefficients of the quantized data based on the zig-zag scan.

The rearranging of the other coefficients representing AC coefficients of the quantized data for each block of the input data in a fashion that produces a zig-zag scan output similar to that of non-data-partitioned data may place a zero value in a $64^{th}$ coefficient of quantized data for each block. The zig-zag scan may perform a zig-zag on all 64 coefficients of quantized data for each block. The placed $64^{th}$ coefficient having the zero value enables the zig-zag scan may perform the zig-zag on all 64 coefficients because without the placed $64^{th}$ coefficient there would only be 63 coefficients as input to the zig-zag scan when data is partitioned.

The bypassing a DC encoding module may be through a forced path (e.g., the forced path may be a same path as that of a non-standard path when non-data-partitioning may be used, such that the non-standard path may be used as an alternative to the DC encoding module of a standard path when data is non-data-partitioned) when data-partitioning is used (e.g., the forced path may be pre-determined when data is data-partitioned). Each block may have 64 pixels. The first coefficient representing the DC coefficient may represent an average YUV value of pixels in the block.

In another aspect, the method of decoder module includes determining that an encoded data may be data-partitioned, separating decode of a first coefficient representing a DC coefficient of a quantized data of each block of the encoded data, bypassing a DC decoding module, determining whether other coefficients representing AC coefficients of the quantized data need to be decoded, decoding the AC coefficients of the quantized data when they need to be decoded, performing an inverse zig-zag scan on the AC coefficients of the quantized data based on the decoding of the AC coefficients, rearranging the other coefficients representing the AC coefficients of the quantized data for each block of the encoded data in a fashion produces an inverse-zig-zag scan output similar to that of a non-data-partitioned data and performing an inverse-quantization and an inverse-discrete cosine transform to form a reconstructed data from the encoded data.

The rearranging of the other coefficients representing AC coefficients of the quantized data for each block of the encoded data in a fashion that produces a inverse-zig-zag scan (e.g., the inverse zig-zag scan may perform an inverse-zig zag scan on all 64 coefficients of quantized data for each block) output similar to that of non-data-partitioned data may place a DC value in a $1^{st}$ coefficient of quantized data for each block (e.g., the DC value may be already decoded from a DC part of a bit-stream of data-partitioned data).

The bypassing of a DC decoding module may be through a forced path when data-partitioning is used (e.g., the forced path may be pre-determined when data is data-partitioned). The forced path may be a same path as that of a non-standard path when non-data-partitioning is used (e.g., the non-standard path may be used as an alternative to the DC decoding module of a standard path when data is non-data-partitioned). The inverse zig-zag scan may use a standard inverse zig-zag table, a horizontal inverse zig-zag table, and/or a vertical inverse zig-zag table, etc.

Each block of zig-zag table may have 64 pixels. The first coefficient representing the DC coefficient may represent an average YUV value of pixels in the block.

In yet another aspect, the system includes encoder module to rearrange other coefficients representing AC coefficients of a quantized data for each block of an input data in a first fashion produces a zig-zag scan output similar to that of a non-data-partitioned data, and a decoder module to rearrange other coefficients representing AC coefficients of quantized data for each block of the encoded data in a second fashion produces an inverse-zig-zag scan output similar to that of the non-data-partitioned data.

A forced path may be used when the data is partitioned which is a same path as that of a non-standard path when non-data-partitioning is used (e.g., the non-standard path may be used as an alternative to a DC decoding module of a standard path when data is non-data-partitioned). The zig-zag scan may use one of a standard zig-zag table, a horizontal zig-zag table, and/or a vertical zig-zag table. The inverse zig-zag scan uses one of a standard inverse zig-zag table, a horizontal inverse zig-zag table, and/or a vertical inverse zig-zag table. Each block may have 64 pixels. A first coefficient of each block representing a DC coefficient may represent an average YUV value of pixels in the block.

The methods, systems, and apparatus disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 5 illustrates an example of zig-zag correction, according to one embodiment.

FIG. 7 is an example of zig-zag decode table, according to one embodiment

DETAILED DESCRIPTION

The method, system, and apparatus of a shared error resiliency path through coefficient reordering is disclosed. Although the present embodiments have been described with reference to specific example embodiments, it will be evident that various modifications and changes may be made to these embodiments without departing from the broader spirit and scope of the various embodiments.

Figure 2:
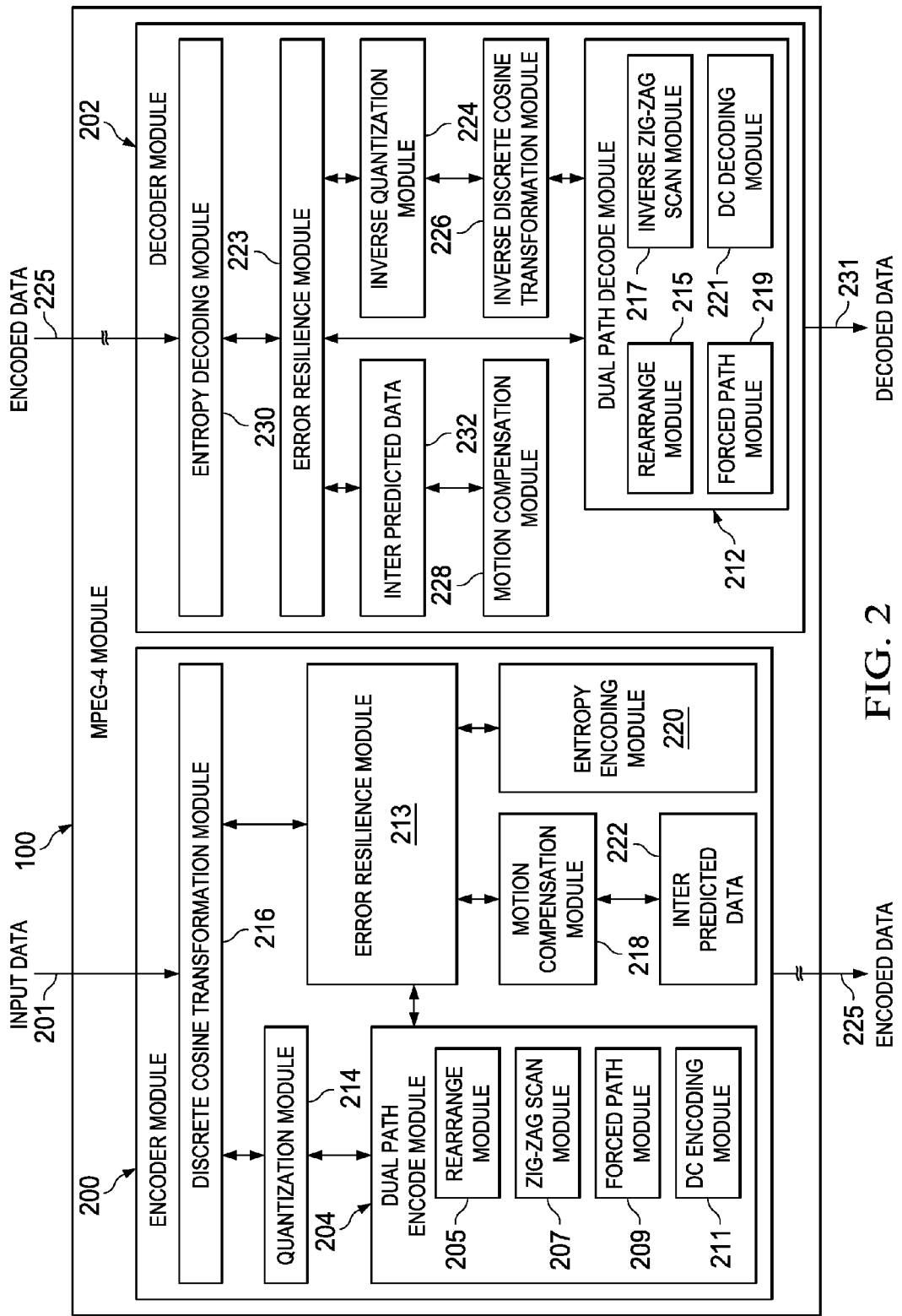
FIG. 2 is an exploded view of MPEG-4 module illustrated in FIG. 1, according to one embodiment.

In one embodiment, the method includes determining that an input data (e.g., the input data 201 of FIG. 2, etc) is to be data-partitioned, performing a discrete cosine transform (e.g., using the discrete cosine transformation module 216 of FIG. 2) and a quantization of the input data 201 (e.g., using the quantization module 214 of FIG. 2) to form a quantized data, separating a first coefficient representing a DC coefficient of the quantized data for each block of the input data 201 (e.g., using the dual path encode module 204 of FIG. 2), rearranging other coefficients representing AC coefficients of the quantized data for each block of the input data in a fashion produces a zig-zag scan output similar to that of a non-data-partitioned data (e.g., using the rearrange module 205 of FIG. 2), bypassing a DC encoding module (e.g., the DC encoding module 211 of FIG. 2), determining whether any of the rearranged AC coefficients of the quantized data need to be encoded, performing a zig-zag scan on the rearranged AC coefficients of the quantized data when they need to be encoded (e.g., using the zig-zag scan module 207 of FIG. 2) and encoding the rearranged AC coefficients of the quantized data based on the zig-zag scan.

In another embodiment, the method of an decoder module includes determining that an encoded data (e.g., the encoded data 225 of the FIG. 2) is data-partitioned, separating decode of a first coefficient representing a DC coefficient of a quantized data of each block of the encoded data, bypassing a DC decoding module (e.g., the DC decoding module 221 of FIG. 2), determining whether other coefficients representing AC coefficients of the quantized data need to be decoded, decoding the AC coefficients of the quantized data when they need to be decoded (e.g., using the dual path decode module 212 of FIG. 2), performing an inverse zig-zag scan on the AC coefficients of the quantized data based on the decoding of the AC coefficients (e.g., using the inverse zig-zag scan module 217 of FIG. 2) and rearranging the other coefficients representing the AC coefficients of the quantized data for each block of the encoded data in a fashion produces an inverse-zig-zag scan output similar to that of a non-data-partitioned data (e.g., using the rearrange module 215 of FIG. 2).

In yet another embodiment, the system includes an encoder module (e.g., the encoder module 200 of FIG. 2) to rearrange other coefficients representing AC coefficients of a quantized data for each block of an input data in a first fashion produces a zig-zag scan output similar to that of a non-data-partitioned data and a decoder module (e.g., the decoder module 202 of FIG. 2) to rearrange other coefficients representing AC coefficients of quantized data for each block of the encoded data in a second fashion produces an inverse-zig-zag scan output similar to that of the non-data-partitioned data.

Figure 1:
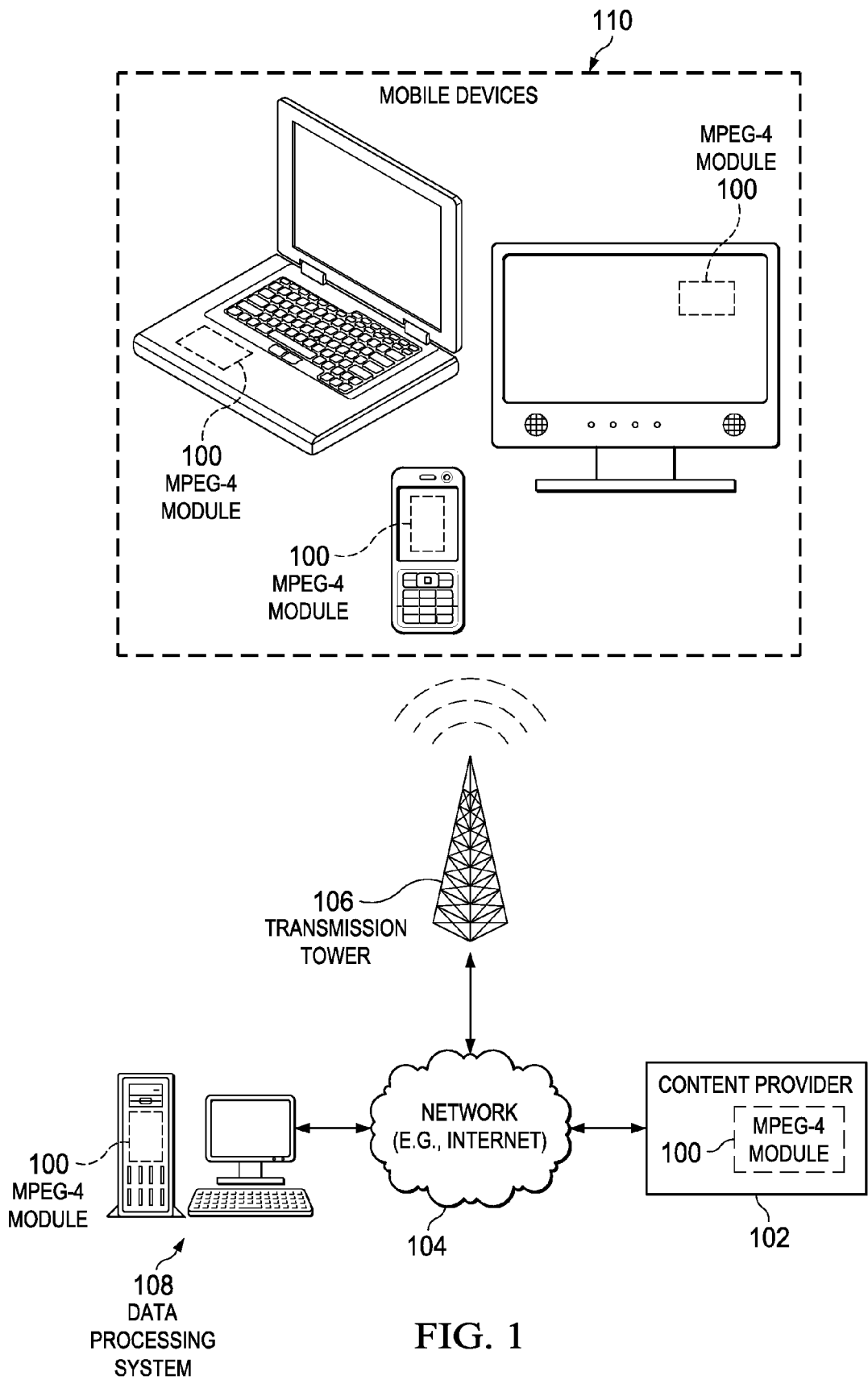
FIG. 1 is a system view illustrating the data communication between mobile devices, data processing system and content providers having MPEG-4 modules, through a network, according to one embodiment.

FIG. 1 is a system view illustrating the data communication between mobile devices, data processing system and content providers having MPEG-4 modules, through a network, according to one embodiment. Particularly, FIG. 1 illustrates an MPEG-4 module 100, content provider 102, a network 104, a transmission tower 106, a data processing system 108, and mobile devices 110, according to one embodiment.

The MPEG-4 module 100 may stream media data at lower data rates and smaller file sizes which may be interpreted and/or translated into the appropriate native signaling messages of each network (e.g., may be through internet, etc.). The content provider 102 may create, stream, and/or present content in a secure and standardized format to client devices (e.g., the mobile devices 110, a data processing system 108, etc.). The network 104 (e.g., Internet, wireless Internet, WAN, LAN, Bluetooth, Wi-Fi, Wi-Max, telecommunications, Zig-Bee, radio frequency and/or infrared network, etc.) may facilitate communication between the client devices (e.g., the mobile devices 110, a data processing system 108, etc.) and the content provider 102.

The transmission tower 106 may be structures designed to support antennas (e.g., called as aerials in UK) for data communication between network 104 and the client devices (e.g., mobile devices 110, etc.). The data processing system 108 (e.g., television, computer, mobile devices, etc.) may be a system that may perform input, processing, storage, output, and/or control functions to accomplish a sequence of operations on media data. The mobile devices 110 may be wireless client devices which receive the data (e.g., the media data, etc.) from the content provider 102 through the network 104.

In example embodiment, the client devices (e.g., the mobile devices 110, the data processing system 108 etc.) may communicate with the content provider 102 to send and/or receive media data through the network 104 facilitated by the MPEG-4 module 100 in both content provide 102 and client devices (e.g., the mobile devices 110, the data processing system 108 etc.).

FIG. 2 is an exploded view of MPEG-4 module 100 illustrated in FIG. 1, according to one embodiment. Particularly, FIG. 2 illustrates an encoder module 200, an input data 201, a decoder module 202, a dual path encode module 204, a rearrange module 205, a zig-zag scan module 207, a forced path module 209, a DC encoding module 211, a dual path decode module 212, an error resilience module 213, a quantization module 214, rearrange module 215, a discrete cosine transformation module 216, an inverse zig-zag scan module 217, a motion compensation module 218, a forced path module 219, an entropy encoding module 220, a DC decoding module 221, an inter predicted data 222, an error resilience module 223, an inverse quantization module 224, an encoded data 225, an inverse discrete cosine transformation module 226, a motion compensation module 228, an entropy decoding module 230, a decoded data 231, an inter predicted data 232, and MPEG-4 module 100, according to one embodiment.

The encoder module 200 may encode an incoming data (e.g., the media data, etc.) into a code for purposes such as compressing information for transmission (e.g., may also include storage, encryption, adding redundancies to the input code, etc.). The input data 201 may be an incoming media data to encoder module 200 for transmission. The decoder module 202 may decode the incoming encoded data 225 into the decoded data 231 similar to that of the input data 201. The dual path encode module 204 may encode the incoming data (e.g., may be a partitioned data or non partitioned data). The rearrange module 205 may rearrange AC coefficients. The zig-zag scan module 207 may scan the rearranged AC coefficients of quantized data using a zig-zag algorithm.

The forced path module 209 may force the flow of data (e.g., data-partitioned data) by bypassing the DC encoding module into a standard path when the data is data-partitioned data. The DC encoding module 211 may encode the DC coefficient in case of the kind of data is data-partitioned data. The dual path decode module 212 may decode/identify the incoming encoded data 225 (e.g., may include data-partitioned data or non-data partitioned data) for further decode operations. The error resilience module 213 may apply error concealment techniques to compensate for the effect of channel losses (e.g., noise, frame distortion) that requires considerable attention. The quantization module 214 may apply a quantization/compression technique which may be achieved by compressing a range of values to a single quantum value to reduce file size and to improve speed of transmission over a transmission channel.

The rearrange module 215 of decoder module 202 may rearrange other coefficients representing AC coefficients of quantized data for each block of the encoded data in a second fashion produces an inverse-zig-zag scan output similar to that of the non-data-partitioned data. The discrete cosine transformation module 216 may apply discrete cosine transformation on the input data 201 to generate a set of discrete cosine transformed coefficients. The inverse zig-zag scan module may apply inverse zig-zag algorithm on the encoded data 225 to get back the original sequence of Discrete cosine transform coefficients. The motion compensation module 218 may apply a motion compensation technique to achieve greater compression ratios by removing information redundancy between media frames.

The forced path module 219 may force the flow of data (e.g., data-partitioned data) by bypassing the DC decoding module into a standard path when the data is data-partitioned data. The entropy encoding module 220 may encode the data (e.g., the media data) in another smaller form. The DC decoding module 221 may decode the DC coefficient of the encoded data 225.

The inter predicted data 222 may be data frames predicted using motion compensation technique using reference frames (e.g., may include future time frames and/or past time frames). The error resilience module 223 may apply error concealment techniques to compensate for the effect of channel losses (e.g., noise, frame distortion) that requires considerable attention. The inverse quantization module 224 may apply an inverse quantization algorithm on the encoded data 225 to get back the original data. The inverse discrete cosine transformation module 226 may apply inverse discrete cosine transformation may reconstruct a sequence from the Discrete Cosine Transform (DCT) coefficients to bring back the spatial information from the MPEG-4 stream.

The motion compensation module 228 in a decoder module 202 may apply a motion compensation technique to decompress the encoded data by removing information redundancy between media frames. The entropy decoding module 230 may decode the entropy encoded data. The decoded data (e.g., the media data similar to the original media data) may be the output produced by the decoder module 202 after decoding operation on encoded data 225.

In example embodiment, the MPEG-4 module may include the encoder module 200 and the decoder module 202. The data may be input to the encoder module 200 which may include discrete cosine transformation module 216, the quantization module 214, the dual path encode module 204, the error resilience module 213, the motion compensation module 218, the inter predicted data 222, and entropy encoding module 220 communicating with one another to generate the encoded data 225. The dual path encode module may include the DC encoding module 211, the forced path module 209, the rearrange module 205, the zig-zag scan module 207. The encoded data 225 may be input to the decoder module 202 which may include the inverse discrete cosine transformation module 226, the inverse quantization module 224, the dual path decode module 212, the error resilience module 223, the motion compensation module 228, the inter predicted data 232, and entropy decoding module 230 communicating with one another to generate the decoded data 231. The dual path decode module may include the DC decoding module 221, the forced path module 219, the rearrange module 215, the inverse zig-zag scan module 217.

In one embodiment, the input data (e.g., the input data 201 of FIG. 2) may be determined to be data-partitioned (e.g., using the dual path encode module 204 of FIG. 2). A discrete cosine transform (e.g., using the discrete cosine transformation module 216 of FIG. 2) and a quantization of the input data (e.g., using the quantization module 214 of FIG. 2) may be performed to form a quantized data. The first coefficient representing a DC coefficient of the quantized data may be separated for each block of the input data 201 (e.g., using the dual path encode module 204 of FIG. 2). The other coefficients representing AC coefficients of the quantized data may be rearranged for each block of the input data 201 in a fashion produces a zig-zag scan output (e.g., as illustrated in FIG. 5) similar to that of a non-data-partitioned data (e.g., using the rearrange module 205 of FIG. 2). The DC encoding module 211 may be bypassed (e.g., using the DC encoding module 211 of FIG. 2).

Any of the rearranged AC coefficients of the quantized data may be determined whether they need to be encoded. A zig-zag scan (e.g., the zig-zag scan 502 of FIG. 5) may be performed on the rearranged AC coefficients of the quantized data when they need to be encoded (e.g., using the zig-zag scan module 207 of FIG. 2). The rearranged AC coefficients of the quantized data may be encoded based on the zig-zag scan 502 (e.g., using the dual path encode module 204 of FIG. 2). The other coefficients representing AC coefficients of the quantized data may be rearranged for each block of the input data 201 in a fashion that produces a zig-zag scan output similar to that of non-data-partitioned data places a zero value in a $64^{th}$ coefficient of quantized data for each block (e.g., using the rearrange module 205 of FIG. 2).

The zig-zag scan 502 may perform a zig-zag on all 64 coefficients of quantized data for each block. The placed $64^{th}$ coefficient may have the zero value enables the zig-zag scan 502 to perform the zig-zag on all 64 coefficients because without the placed $64^{th}$ coefficient there may be 63 coefficients as input to the zig-zag scan 502 when data may be partitioned (e.g., using the zig-zag scan module 207 of FIG. 2). The DC encoding module 211 may be bypassed through a forced path when data-partitioning is used (e.g., the forced path may be pre-determined when data is data-partitioned, using the forced path module 209 of FIG. 2). The forced path may be a same path as that of a non-standard path when non-data-partitioning may be used (e.g., the non-standard path is used as an alternative to the DC encoding module 211 of a standard path when data is non-data-partitioned).

The zig-zag scan 502 may use any one of a standard zig-zag table, a horizontal zig-zag table, and/or a vertical zig-zag table (e.g., using the zig-zag scan module 207 of FIG. 2). The each block may have 64 pixels. The first coefficient representing the DC coefficient may represent an average YUV value of pixels in the block. The encoded data (e.g., the encoded data 225 of FIG. 2) that is data-partitioned may be determined (e.g., using the dual path decode module 212 of FIG. 2). Decode of a first coefficient representing a DC coefficient of a quantized data of each block of the encoded data may be separated.

The DC decoding module 221 may be bypassed (e.g., using the DC decoding module 221 of FIG. 2). The other coefficients representing AC coefficients of the quantized data may be determined whether they need to be decoded. The AC coefficients of the quantized data may be decoded when they need to be decoded (e.g., using the dual path decode module 212 of FIG. 2). The inverse zig-zag scan may be performed on the AC coefficients of the quantized data based on the decoding of the AC coefficients (e.g., using the inverse zig-zag scan module 217 of FIG. 2).

The other coefficients representing the AC coefficients of the quantized data may be rearranged for each block of the encoded data 225 in a fashion produces an inverse-zig-zag scan output similar to that of a non-data-partitioned data (e.g., using the rearrange module 215 of FIG. 2). An inverse-quantization and an inverse-discrete cosine transform may be performed to form a reconstructed data from the encoded data. The other coefficients representing the AC coefficients of the quantized data may be rearranged for each block of the encoded data 225 in a fashion that produces a inverse-zig-zag scan output similar to that of non-data-partitioned data places a DC value in a $1^{st}$ coefficient of quantized data for each block. The DC value may be already decoded from a DC part of a bit-stream of data-partitioned data (e.g., using the rearrange module 215 of FIG. 2).

The inverse zig-zag scan may perform an inverse-zig-zag scan on all 64 coefficients of quantized data for each block (e.g., using the inverse zig-zag scan module 217 of FIG. 2). The DC decoding module 221 may be bypassed through a forced path when data-partitioning may be used (e.g., the forced path may pre-determined when data is data-partitioned) (e.g., using the forced path module 219 of FIG. 2). The forced path may be a same path as that of a non-standard path when non-data-partitioning may be used (e.g., the non-standard path may be used as an alternative to the DC decoding module 221 of a standard path when data is non-data-partitioned).

The inverse zig-zag scan may use any one of a standard inverse zig-zag table, a horizontal inverse zig-zag table, and/or a vertical inverse zig-zag table (e.g., through the inverse zig-zag scan module 217 of FIG. 2). The each block may have 64 pixels. The first coefficient representing the DC coefficient may represent an average YUV value of pixels in the block. An encoder module (e.g., the encoder module 200 of FIG. 2) may rearrange other coefficients representing AC coefficients of a quantized data for each block of an input data 201 in a first fashion produces a zig-zag scan output similar to that of a non-data-partitioned data.

The decoder module (e.g., the decoder module 202 of FIG. 2) may rearrange other coefficients representing AC coefficients of the quantized data for each block of the encoded data 225 in a second fashion produces an inverse-zig-zag scan output similar to that of the non-data-partitioned data. The forced path may be used when the data is partitioned which is a same path as that of a non-standard path when non-data-partitioning is used (e.g., the non-standard path may be used as an alternative to a DC decoding module of a standard path when data is non-data-partitioned). The zig-zag scan 502 may use any one of a standard zig-zag table, a horizontal zig-zag table, and/or a vertical zig-zag table.

The inverse zig-zag scan may use any one of a standard inverse zig-zag table, the horizontal inverse zig-zag table, and/or the vertical inverse zig-zag table. The each block may have 64 pixels. The first coefficient of each block representing a DC coefficient may represent an average YUV value of pixels in the block.

Figure 3A:
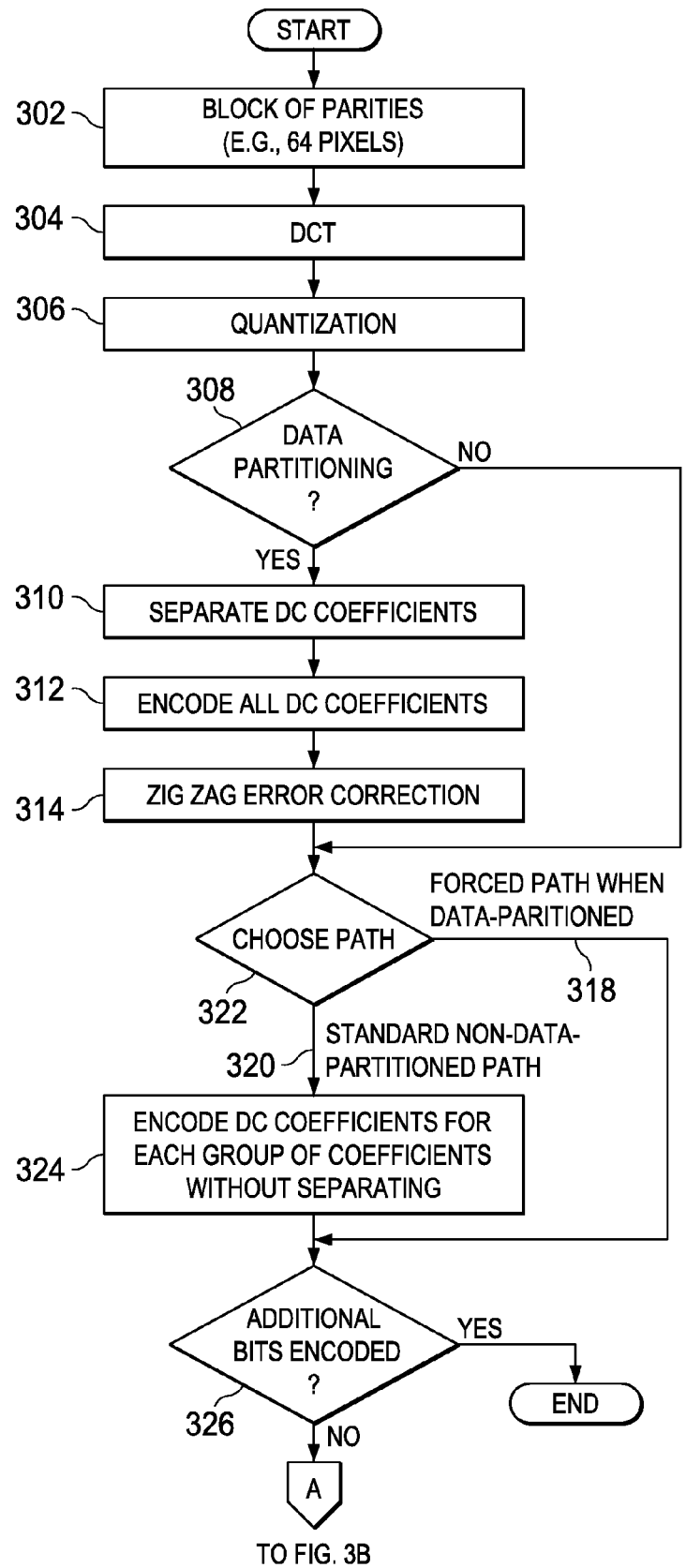
FIG. 3A is a flow chart for dual path encoding, according to one embodiment.

FIG. 3A is a flow chart for dual path encoding 350, according to one embodiment. Particularly, FIG. 3A illustrates various operations according to one embodiment.

In operation 302, the block of parities (e.g., 64 pixels) may be an input to the discrete cosine transform. In operation 304, the DCT may be applied on the input (e.g., the block of parities). In operation 306, the discrete cosine transform coefficient may be quantized. In operation 308, a condition may be determined to check whether the data is data-partitioned or non-data-partitioned. In operation 310, if the data is data-partitioned data then operation 310 may be performed or else operation 322 is performed. In operation 310, the DC coefficients may be separated out from the other coefficients. In operation 312, the separated DC coefficients may be encoded. In operation 314, zig-zag error correction may be performed. In operation 322, a condition may be determined to check which path to be chosen depending on the data (e.g., data-partitioned data or non-data-partitioned). If the data is data-partitioned data then operation 326 through the forced path (e.g., using the forced path when data-partitioned 318) may be performed, or else operation 324 through standard non-data-partitioned path 320 may be performed. In operation 326, a condition may be determined to check whether the additional bits are encoded or not.

Figure 3B:
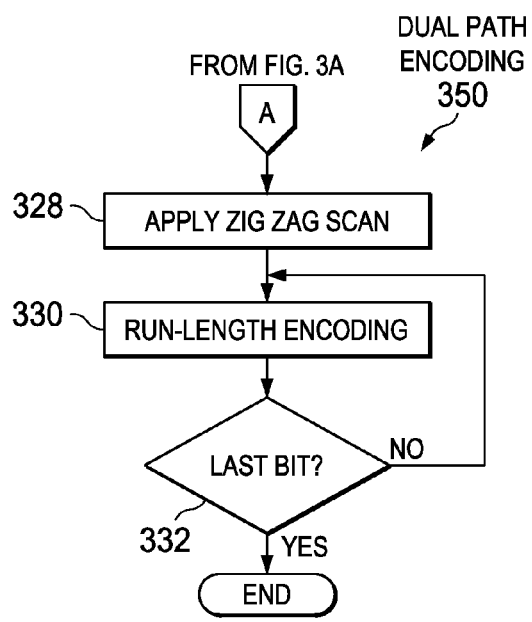
FIG. 3B is the continuation of flow chart illustrated in FIG. 3A showing additional processes, according to one embodiment

FIG. 3B is the continuation of flow chart illustrated in FIG. 3A showing additional processes, according to one embodiment.

In operation 328, zig-zag scan may be applied to encoded coefficients. In operation 330, run-length encoding may be performed on other remaining coefficients. In operation 332, a condition may be determined to check for last bit. If the bit is a last bit then the encoding process ends, else the operation 330 is performed.

Figure 4A:
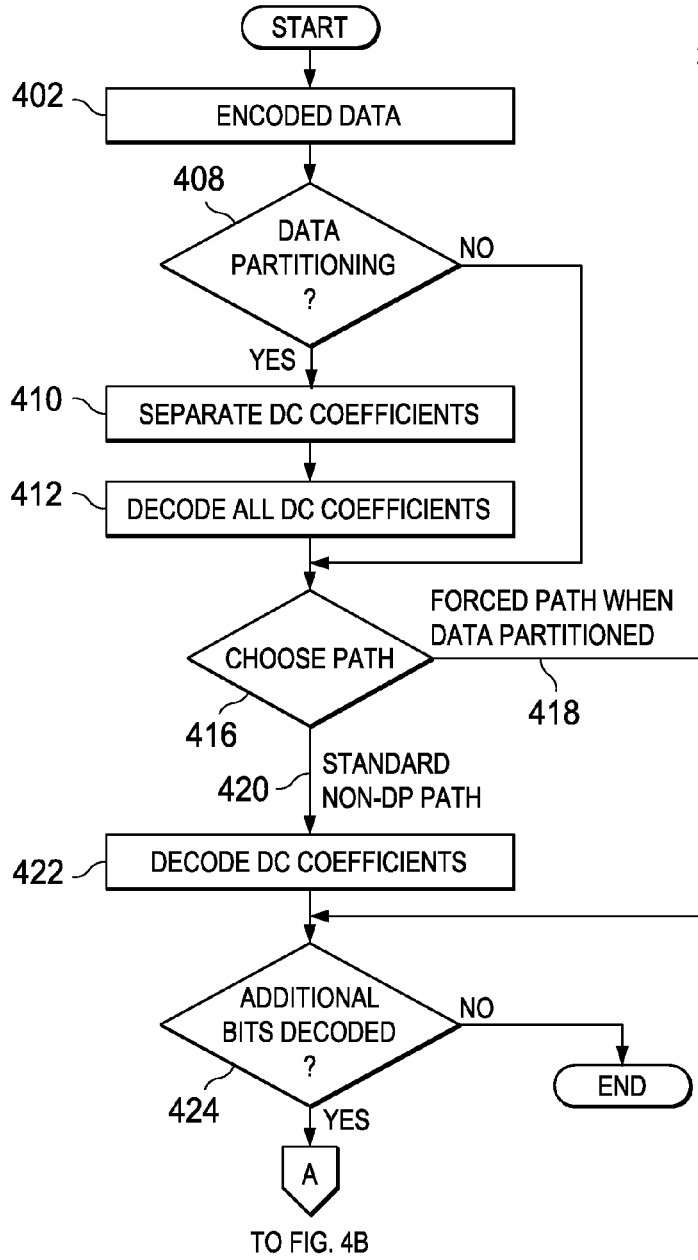
FIG. 4A is a flow chart for dual path decoding, according to one embodiment

FIG. 4A is a flow chart for dual path decoding 450, according to one embodiment. Particularly, FIG. 4A illustrates various operations according to one embodiment.

In operation 402, the dual path decode module 212 may take the encoded data as input. In operation 408, a condition may be determined to check whether the data is data-partitioned or non-data-partitioned so that the data can be bypassed to operation 416 in case the data is non-data-partitioned, else operation 410 may be performed. In operation 410, DC coefficients from the data (e.g., from data-partitioned data) may be separated. In operation 412, all the DC coefficients may be decoded. In operation 416, a condition may be determined to decide for a forced path when the data is data-partitioned 418, else for a standard non data-partitioned path 420 may be chosen. In operation 422, DC coefficients may be decoded in case of the data being non-data-partitioned data. In operation 424, a condition is determined to check whether additional bits are decoded, if the additional bits are decoded operation 426 of FIG. 4B may be performed, else the process flow is stopped when all the data bits are decoded.

Figure 4B:
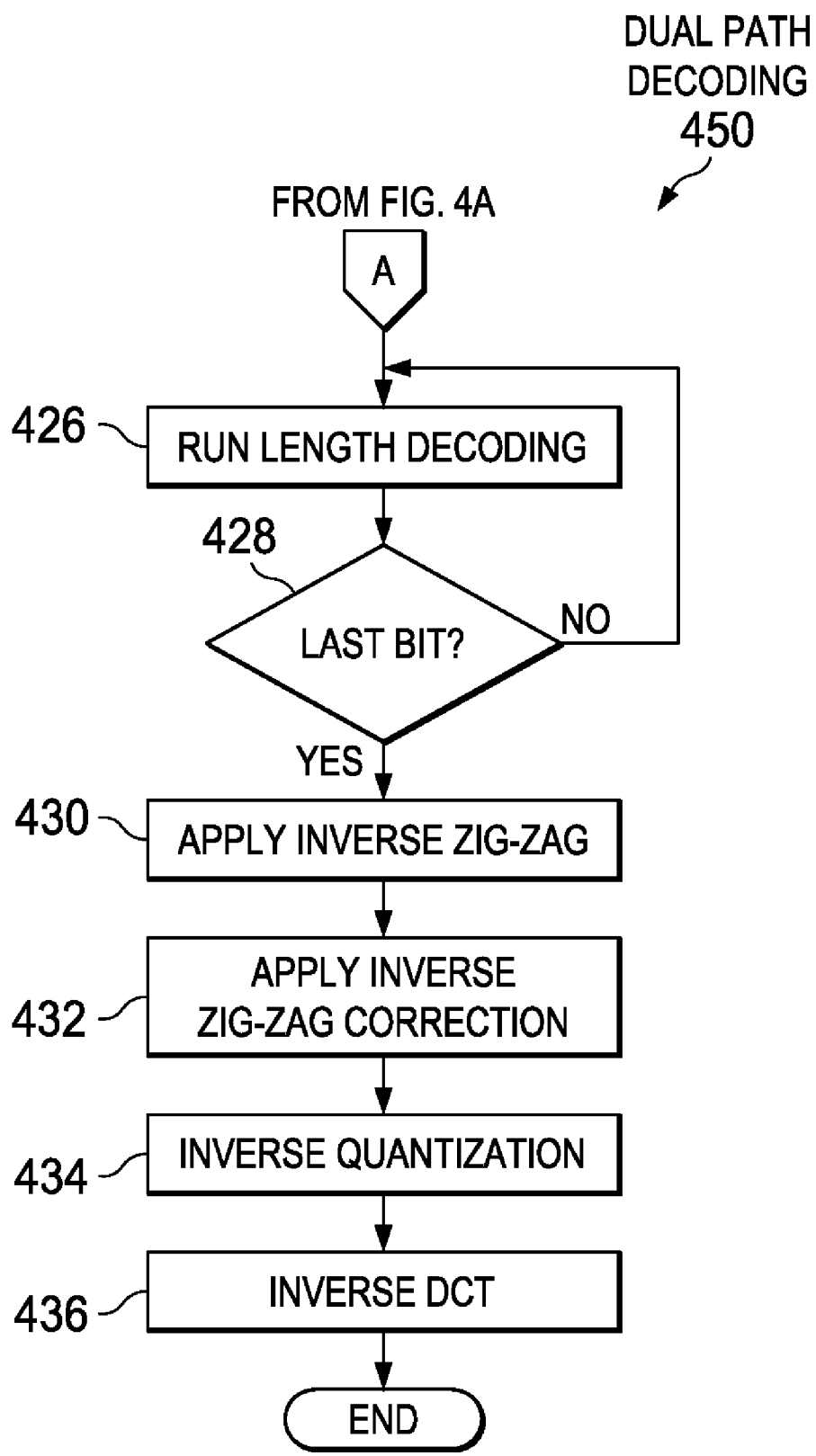
FIG. 4B is the continuation of flow chart illustrated in FIG. 4A showing additional processes, according to one embodiment.

FIG. 4B is the continuation of flow chart illustrated in FIG. 4A showing additional processes, according to one embodiment. In operation 426, the decoding operation for remaining bits may be performed. In operation 428, a condition is determined to check for last bit data, if the bit is the last bit, operation 430 may be performed, else the operation 426 may be performed. In operation 430, inverse zig-zag may be applied to the data. In operation 432, an inverse zig-zag correction may be applied on the data (e.g., using the rearrange module). In operation 434, inverse quantization may be applied on rearranged data. In operation 436, inverse DCT (discrete cosine transform) may be applied on outputs obtained from the operation 434.

FIG. 5 illustrates an example of zig-zag correction 550, according to one embodiment. Particularly, FIG. 5 illustrates a standard zig-zag scan 502, and a corrected zig-zag scan for changed sequence 504, according to one embodiment.

The standard zig-zag scan 502 may illustrate a general zig-zag scan for discrete cosine transform coefficients. The corrected zig-zag scan for changed sequence 504 may illustrate a corrected zig-zag scan for discrete cosine transform coefficients when DC coefficient is removed and last bit may be considered as zero.

In example embodiment, the figure illustrates the standard zig-zag scan for discrete cosine transform coefficients with general sequence (e.g., 23, 12, 08, 16, 00, 04, 11, 16, 04, 05, 00, 11, 00, 09, 15, 00, 12, 03, 04, 01, 13, 16, 00, 10, 06, 00, 00, 10, 01, 00, 06, 00, 00, 09, 06, 02, 04, 01, 01, 01, 02, 08, 07, 00, 01, 00, 01, 01, 00, 06, 00, 01, 01, 00, 04, 00, 02, 00, 00, 00, 00, 00, 03, 00.) and the corrected zig-zag scan for discrete cosine transform coefficients when DC coefficient is removed and where last bit is considered as zero (e.g., 12, 08, 16, 00, 04, 11, 16, 04, 05, 00, 11, 00, 09, 15, 00, 12, 03, 04, 01, 13, 16, 00, 10, 06, 00, 00, 10, 01, 00, 06, 00, 00, 09, 06, 02, 04, 01, 01, 01, 02, 08, 07, 00, 01, 00, 01, 01, 00, 06, 00, 01, 01, 00, 04, 00, 02, 00, 00, 00, 00, 00, 03, 00, 00).

Figure 6:
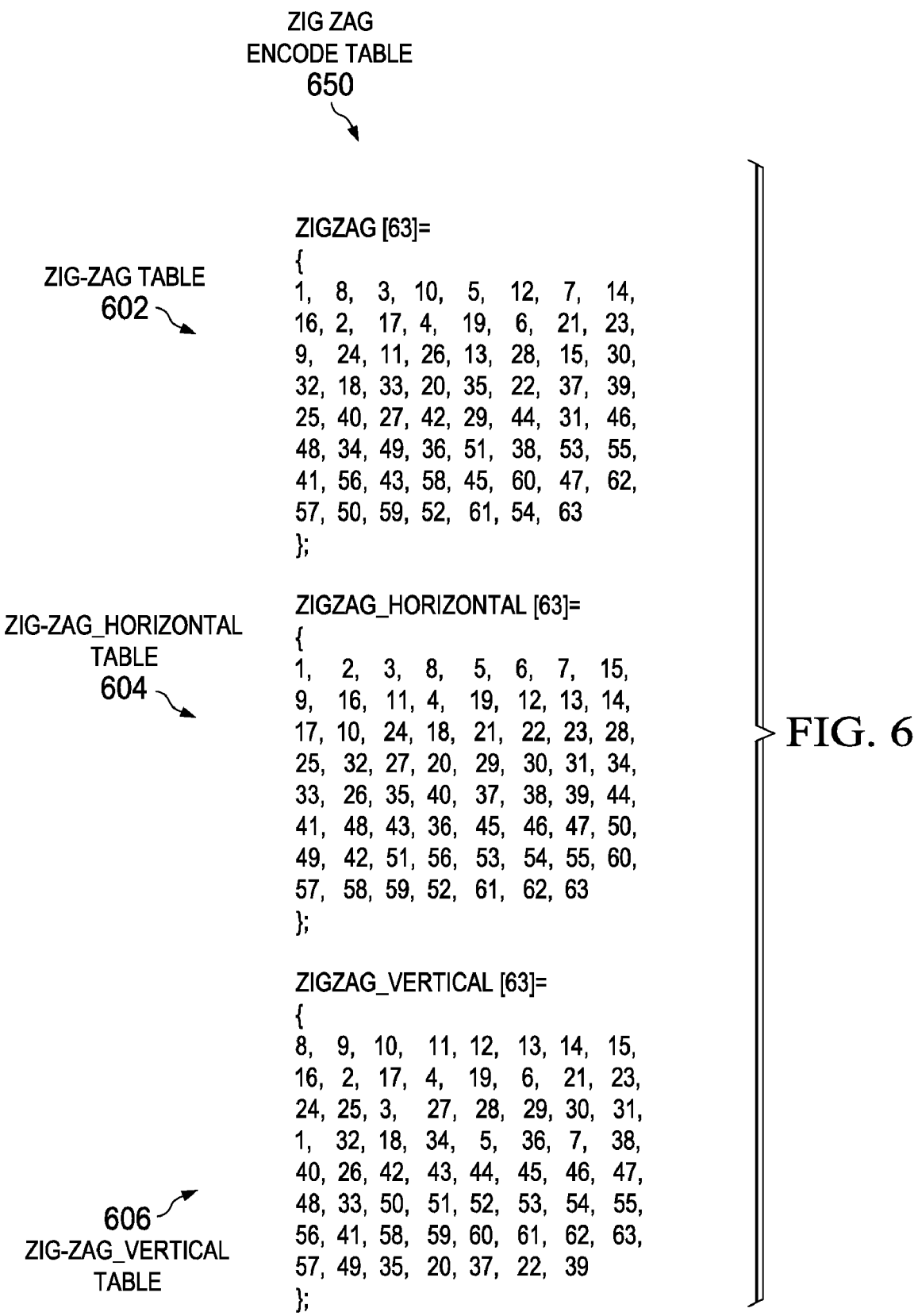
FIG. 6 is an example of zig-zag encode table, according to one embodiment

FIG. 6 is an example of zig-zag encode table 650, according to one embodiment. Particularly, FIG. 6 illustrates a zig-zag table 602, a zig-zag_horizontal table 604, and a zig-zag_vertical table 606, according to one embodiment.

The zig-zag table 602 may illustrate a zigzag [63] array for the data-partitioned case encoding 63 discrete coefficients excluding DC coefficient. The zig-zag_horizontal table 604 may illustrate a zigzag_horizontal [63] array for the data-partitioned case encoding 63 discrete coefficients excluding DC coefficient. The zig-zag_vertical table 606 may illustrate a zigzag_vertical [63] array for the data-partitioned case encoding 63 discrete coefficients excluding DC coefficient.

In example embodiment, the FIG. 6 states that for the data-partitioned case we need to encode only 63 discrete cosine transform coefficient excluding DC DCT. To overcome this situation giving DC coefficient may be avoided and AC residual may be reordered such that it will not affect zig-zag scanning output. The arrays illustrated in FIG. 6 (e.g., corresponding to all 3 scanning format) may be used for re-ordering 63 AC coefficients and the $64^{th}$ may be replaced with zero.

FIG. 7 is an example of zig-zag decode table 750, according to one embodiment. Particularly, FIG. 7 illustrates a zig-zag_inverse table 702, a zig-zag_horizontal_inverse table 704, and a zig-zag_vertical-inverse table 706, according to one embodiment.

The zig-zag_inverse table 702 may illustrate a zigzag_inverse [64] array for the data-partitioned case decoding 63 discrete coefficients. The zig-zag_horizontal_inverse table 704 may illustrate a zigzag_horizontal_inverse [64] array for the data-partitioned case encoding 63 discrete coefficients. The zig-zag_vertical_inverse table 706 may illustrate a zig-zag_vertical_inverse [64] array for the data-partitioned case encoding 63 discrete coefficients.

In example embodiment, FIG. 7 states that the zig-zag scanned output of these 63 coefficients may not be as per requirement. These coefficients may be reordered before applying inverse quantization and inverse discrete cosine transform. For re-ordered decoded 63 coefficient the following scan tables (e.g., corresponding to all 3 scanning format) may be used. The $zero^{th}$ index may be filled with DC coefficient which may be already decoded from the DC part of the stream.

Figure 8:
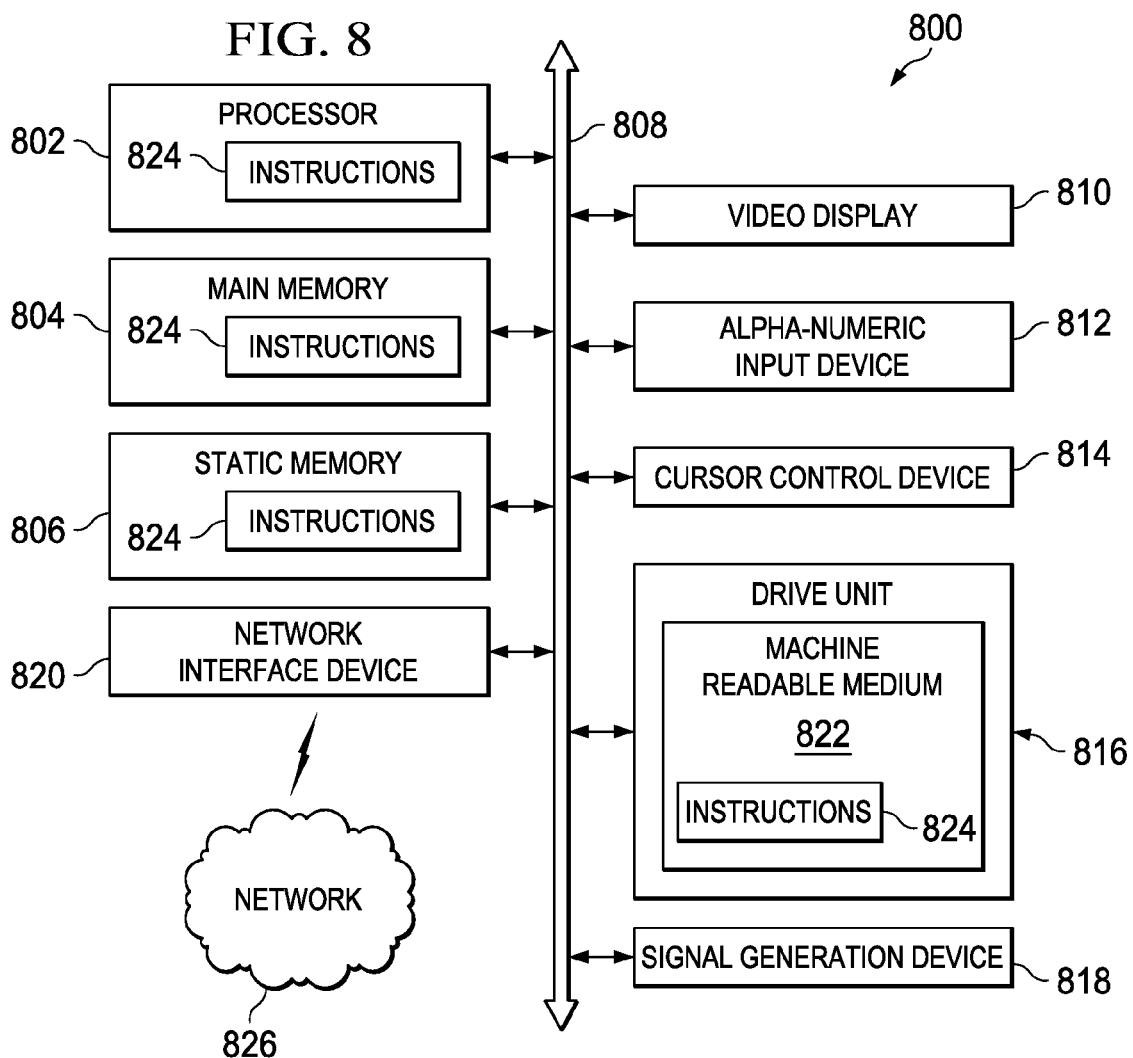
FIG. 8 is a diagrammatic system view of a data processing system in which any of the embodiments disclosed here in may be performed, according to one embodiment.

FIG. 8 is a diagrammatic system view of a data processing system in which any of the embodiments disclosed here in may be performed, according to one embodiment. Particularly, the diagrammatic system view 800 of FIG. 8 illustrates a processor 802, a main memory 804, a static memory 806, a bus 808, a video display 810, an alpha-numeric input device 812, a cursor control device 814, a drive unit 816, a signal generation device 818, a network interface device 820, a machine readable medium 822, instructions 824, and a network 826, according to one embodiment.

The diagrammatic system view 800 may indicate a personal computer and/or the data processing system in which one or more operations disclosed herein are performed. The processor 802 may be a microprocessor, a state machine, an application specific integrated circuit, a field programmable gate array, etc. (e.g., Intel® Pentium® processor). The main memory 804 may be a dynamic random access memory and/or a primary memory of a computer system.

The static memory 806 may be a hard drive, a flash drive, and/or other memory information associated with the data processing system. The bus 808 may be an interconnection between various circuits and/or structures of the data processing system. The video display 810 may provide graphical representation of information on the data processing system. The alpha-numeric input device 812 may be a keypad, a keyboard and/or any other input device of text (e.g., a special device to aid the physically handicapped).

The cursor control device 814 may be a pointing device such as a mouse. The drive unit 816 may be the hard drive, a storage system, and/or other longer term storage subsystem. The signal generation device 818 may be a bios and/or a functional operating system of the data processing system. The network interface device 820 may be a device that performs interface functions such as code conversion, protocol conversion and/or buffering required for communication to and from the network 826. The machine readable medium 822 may provide instructions on which any of the methods disclosed herein may be performed. The instructions 824 may provide source code and/or data code to the processor 802 to enable any one or more operations disclosed herein.

Figure 9:
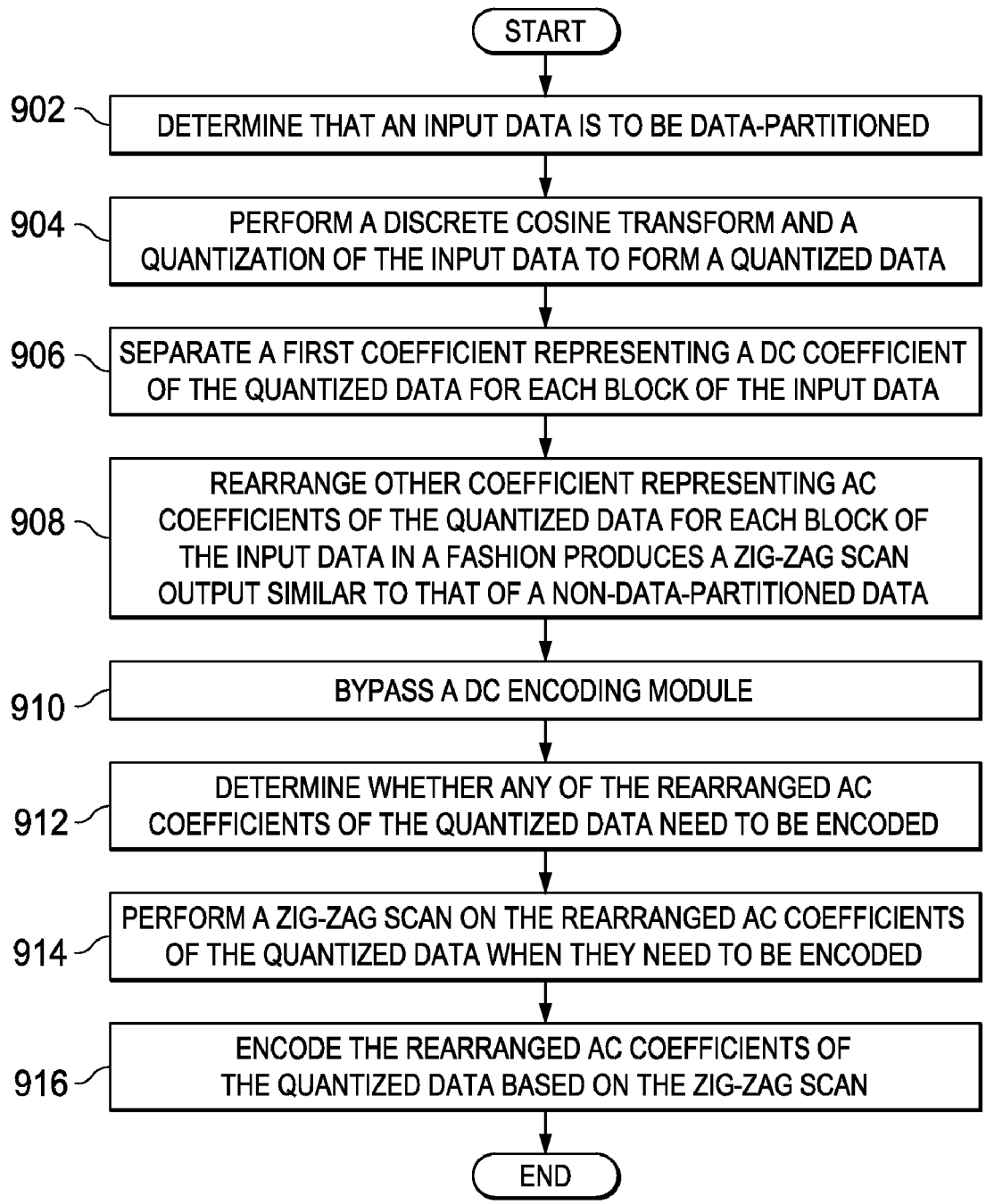
FIG. 9 is a process flow of encoding the rearranged AC coefficients of the quantized data based on the zig-zag scan, according to one embodiment.

FIG. 9 is a process flow of encoding the rearranged AC coefficients of the quantized data based on the zig-zag scan, according to one embodiment. In operation 902, an input data (e.g., the input data 201 of FIG. 2) to be data-partitioned may be determined (e.g., using the dual path encode module 204 of FIG. 2). In operation 904, a discrete cosine transform (e.g., using the discrete cosine transformation module 216 of FIG. 2) and a quantization of the input data (e.g., using the quantization module 214 of FIG. 2) may be performed to form a quantized data. In operation 906, a first coefficient representing a DC coefficient of the quantized data may be separated for each block of the input data 201 (e.g., using the dual path encode module 204 of FIG. 2).

In operation 908, the other coefficients representing AC coefficients of the quantized data may be rearranged for each block of the input data in a fashion produces a zig-zag scan output similar to that of a non-data-partitioned data (e.g., using the rearrange module 205 of FIG. 2). In operation 910, a DC encoding module may be bypassed (e.g., the DC encoding module 211 of FIG. 2). In operation 912, any of the rearranged AC coefficients of the quantized data may be determined whether they need to be encoded.

In operation 914, a zig-zag scan (e.g., the zig-zag scan 502 of FIG. 5) on the rearranged AC coefficients of the quantized data may be performed when they need to be encoded (e.g., using the zig-zag scan module 207 of FIG. 2). In operation 916, the rearranged AC coefficients of the quantized data may be encoded based on the zig-zag scan 502 (e.g., using the dual path encode module 204 of FIG. 2). The other coefficients representing AC coefficients of the quantized data may be rearranged for each block of the input data 201 in a fashion that produces a zig-zag scan output may be similar to that of non-data-partitioned data places a zero value in a 64$^{th}$ coefficient of quantized data for each block (e.g., using the rearrange module 205 of FIG. 2).

The zig-zag scan 502 may perform a zig-zag on all 64 coefficients of quantized data for each block, and/or the placed 64$^{th}$ coefficient having the zero value enables the zig-zag scan 502 to perform the zig-zag on all 64 coefficients because without the placed 64$^{th}$ coefficient there may be 63 coefficients as input to the zig-zag scan 502 when data may be partitioned (e.g., using the zig-zag scan module 207 of FIG. 2). The DC encoding module (e.g., the DC encoding module 211 of FIG. 2) may be bypassed through a forced path when data-partitioning is used (e.g., the forced path may be pre-determined when data is data-partitioned, using the forced path module 209 of FIG. 2).

The forced path may be a same path as that of a non-standard path when non-data-partitioning is used (e.g., the non-standard path may be used as an alternative to the DC encoding module 211 of a standard path when data may be non-data-partitioned). The zig-zag scan may use any one of a standard zig-zag table, a horizontal zig-zag table, and/or a vertical zig-zag table (e.g., using the zig-zag scan module 207 of FIG. 2). The each block may have 64 pixels. The first coefficient representing the DC coefficient may represent an average YUV value of pixels in the block.

Figure 10:
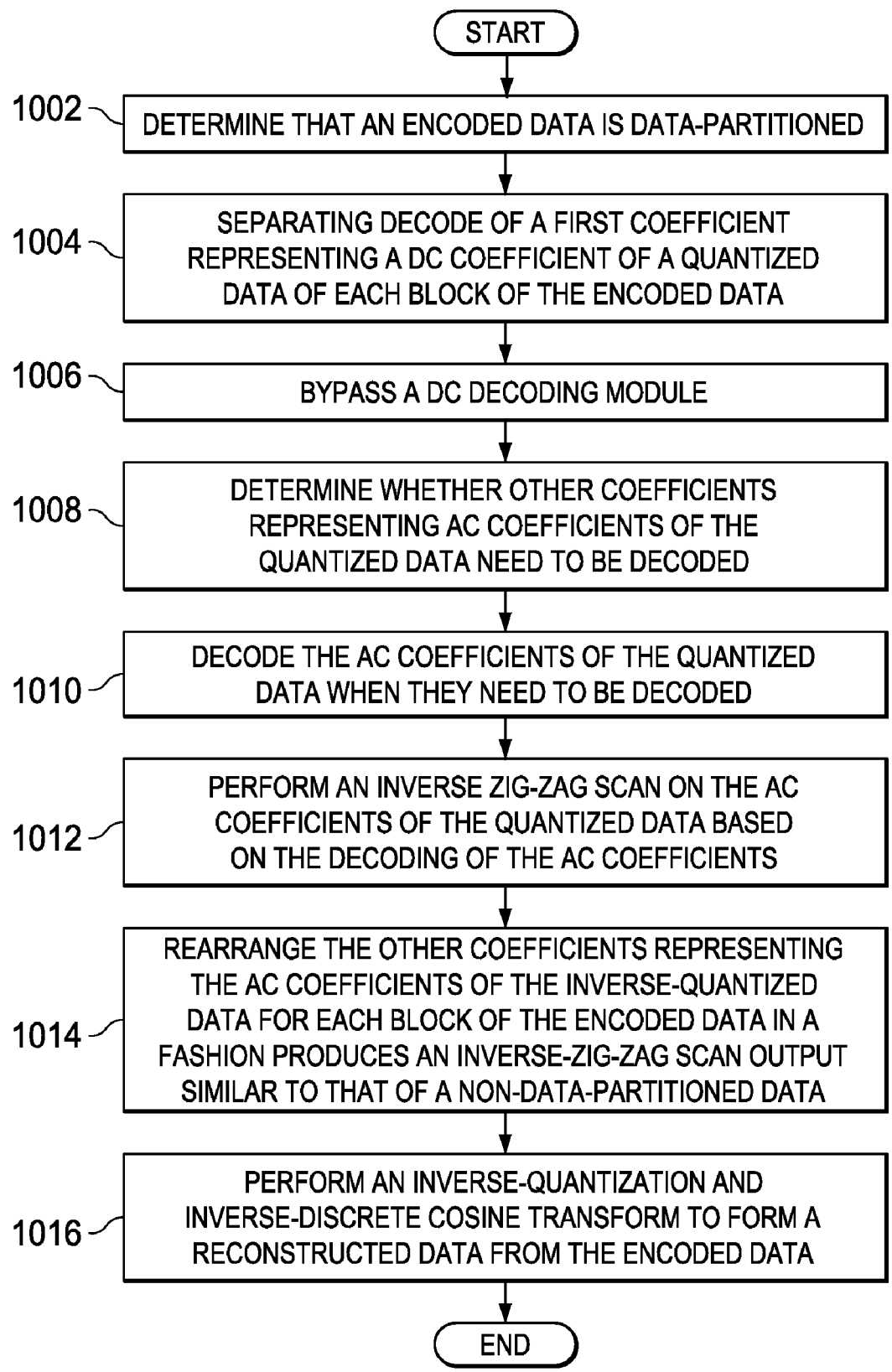
FIG. 10 is a process flow of rearranging other coefficients representing AC coefficients of quantized data for each block of encoded data, according to one embodiment Other features of the present embodiments will be apparent from the accompanying drawings and from the detailed description that follows.

FIG. 10 is a process flow of rearranging other coefficients representing AC coefficients of quantized data for each block of encoded data, according to one embodiment. In operation 1002, an encoded data (e.g., the encoded data 225 of FIG. 2) may be determined a data-partitioned e.g., using the dual path decode module 212 of FIG. 2). In operation 1004, separating decode of a first coefficient representing a DC coefficient of a quantized data of each bock of the encoded data.

In operation 1006, a DC decoding module (e.g., the DC decoding module 221 of FIG. 2) may be bypassed. In operation 1008, the other coefficients representing AC coefficients of the quantized data may be determined whether they need to be decoded. In operation 1010, the AC coefficients of the quantized data may be decoded when they need to be decoded (e.g., using the dual path decode module 212 of FIG. 2). In operation 1012, an inverse zig-zag scan may be performed on the AC coefficients of the quantized data based on the decoding of the AC coefficients (e.g., using the inverse zig-zag scan module 217 of FIG. 2). In operation 1014, the other coefficients representing the AC coefficients of the quantized data may be rearranged for each block of the encoded data 225 in a fashion produces an inverse-zig-zag scan output similar to that of a non-data-partitioned data (e.g., using the rearrange module 215 of FIG. 2). In operation 1016, an inverse-quantization and an inverse-discrete cosine transform may be performed to form a reconstructed data from the encoded data.

The other coefficients may represent AC coefficients of the quantized data may be rearranged for each block of the encoded data in a fashion that produces a inverse-zig-zag scan output may be similar to that of non-data-partitioned data places a DC value in a 1$^{st}$ coefficient of quantized data for each block. The DC value may be already decoded from a DC part of a bit-stream of data-partitioned data (e.g., using the DC decoding module 221 of FIG. 2). The inverse zig-zag scan may perform an inverse-zig-zag scan on all 64 coefficients of quantized data for each block (e.g., using the inverse zig-zag scan module 217 of FIG. 2).

The DC decoding module (e.g., the DC decoding module 221 of FIG. 2) may be bypassed through a forced path when data-partitioning is used (e.g., the forced path is pre-determined when data may be data-partitioned, using the forced path module 209 of FIG. 2). The forced path may be a same path as that of a non-standard path when non-data-partitioning is used (e.g., the non-standard path may be used as an alternative to the DC decoding module 221 of a standard path when data is non-data-partitioned). The inverse zig-zag scan may use any one of a standard inverse zig-zag table, a horizontal inverse zig-zag table, and/or a vertical inverse zig-zag table. The each block may have 64 pixels. The first coefficient representing the DC coefficient may represent an average YUV value of pixels in the block.

Although the present embodiments have been described with reference to specific example embodiments, it will be evident that various modifications and changes may be made to these embodiments without departing from the broader spirit and scope of the various embodiments. For example, the various devices, modules, analyzers, generators, etc.

described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., Application Specific Integrated Circuitry (ASIC) and/or in Digital Signal Processor (DSP) circuitry).

For example, the MPEG-4 module 100, the encoder module 200, the input data 201, the decoder module 202, the dual path encode module 204, the rearrange module 205, the zig-zag scan module 207, the forced path module 209, the DC encoding module 211, the dual path decode module 212, the error resilience module 213, the quantization module 214, the rearrange module 215, the discrete cosine transformation module 216, the inverse zig-zag scan module 217, the motion compensation module 218, the forced path module 219, the entropy encoding module 220, the DC decoding module 221, the error resilience module 223, the inverse quantization module 224, the inverse discrete cosine transformation module 226, the motion compensation module 228, and the entropy decoding module 230 of FIG. 1-10 may be enabled using software and/or using transistors, logic gates, and electrical circuits (e.g., application specific integrated ASIC circuitry) such as a MPEG-4 circuit, an encoder circuit, a decoder circuit, a dual path encode circuit, a rearrange circuit, a zig-zag scan circuit, a forced path circuit, a DC encoding circuit, a dual path decode circuit, an error resilience circuit, a quantization circuit, rearrange circuit, a discrete cosine transformation circuit, an inverse zig-zag scan circuit, a motion compensation circuit, a forced path circuit, an entropy encoding circuit, a DC decoding circuit, an error resilience circuit, an inverse quantization circuit, an inverse discrete transformation circuit, a motion compensation circuit, an entropy decoding circuit, and other circuits.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

The modules in the figures are shown as distinct and communicating with only a few specific module and not others. The modules may be merged with each other, may perform overlapping functions, and may communicate with other modules not shown to be connected in the Figures. Accordingly, the specification and drawings are to be regarded in an illustrative rather than a restrictive sense.

What is claimed is:

1. A non-transitory machine-implemented method of operating an encoder module using a processor, comprising:
   determining that an input data is to be data-partitioned;
   performing a discrete cosine transform and a quantization of the input data to form a quantized data;
   separating a first coefficient representing a DC coefficient of the quantized data for each block of the input data;
   rearranging other coefficients representing AC coefficients of the quantized data for each block of the input data in a fashion that produces a zig-zag scan output similar to that of a non-data-partitioned data;
   bypassing a DC encoding module;
   determining whether any of the rearranged AC coefficients of the quantized data need to be encoded;
   performing a zig-zag scan on the rearranged AC coefficients of the quantized data and
   encoding the rearranged AC coefficients of the quantized data based on the zig-zag scan.

2. The method of claim 1 wherein the rearranging of the other coefficients representing AC coefficients of the quantized data for each block of the input data in a fashion that produces a zig-zag scan output similar to that of non-data-partitioned data places a zero value in a $64^{th}$ coefficient of quantized data for each block.

3. The method of claim 2 wherein the zig-zag scan performs a zig zag on all 64 coefficients of quantized data for each block, and wherein the placed 64 th coefficient having the zero value enables the zig-zag scan to perform the zig zag on all 64 coefficients because without the placed 64th coefficient there would only be 63 coefficients as input to the zig-zag scan when data is partitioned.

4. The method of claim 3 wherein the bypassing a DC encoding module is through forced path when data-partitioning is used, such that the forced path is pre-determined when data is data-partitioned.

5. The method of claim 4 wherein the forced path is a same path as that of a non-standard path when non-data-partitioning is used, such that the non-standard path is used as an alternative to the DC encoding module of a standard path when data is non-data-partitioned.

6. The method of claim 1 wherein the zig-zag scan uses one of a standard zig-zag table, a horizontal zig-zag table, and a vertical zig-zag table.

7. The method of claim 6 wherein each block has 64 pixels, and wherein the first coefficient representing the DC coefficient represents an average YUV value of other pixels in an adjacent block.

8. The method of claim 1 in a form of a machine-readable medium embodying a set of instructions that, when executed by a machine, causes the machine to perform the method of claim 1.

9. A non-transitory machine-implemented method of operating a decoder module using a processor, comprising:
   determining that an encoded data is data-partitioned;
   separating decode of a first coefficient representing a DC coefficient of a quantized data of each block of the encoded data;
   bypassing a DC decoding module;
   determining whether other coefficients representing AC coefficients of the quantized data need to be decoded;
   decoding the AC coefficients of the quantized data when they need to be decoded;
   performing an inverse zig-zag scan on the AC coefficients of the quantized data based on the decoding of the AC coefficients;
   rearranging the other coefficients representing the AC coefficients of the quantized data for each block of the encoded data in a fashion that produces an inverse-zig-zag scan output similar to that of a non-data-partitioned data; and
   performing an inverse-quantization and an inverse-discrete cosine transform to form a reconstructed data from the encoded data.

10. The method of claim 9 wherein the rearranging of the other coefficients representing AC coefficients of the quantized data for each block of the encoded data in a fashion that produces a inverse-zig-zag scan output similar to that of non-data-partitioned data places a DC value in a $1^{st}$ coefficient of quantized data for each block, wherein the DC value is already decoded from a DC part of a bit-stream of data-partitioned data.

11. The method of claim 10 wherein the inverse zig-zag scan performs an inverse-zig zag scan on all 64 coefficients of inverse-quantized data for each block.

12. The method of claim 11 wherein the bypassing a DC decoding module is through a forced path when data-partitioning is used, such that the forced path is pre-determined when data is data-partitioned.

13. The method of claim 12 wherein the forced path is a same path as that of a non-standard path when non-data-partitioning is used, such that the non-standard path is used as an alternative to the DC decoding module of a standard path when data is non-data-partitioned.

14. The method of claim 13 wherein the inverse zig-zag scan uses one of a standard inverse zig-zag table, a horizontal inverse zig-zag table, and a vertical inverse zig-zag table.

15. The method of claim 14 wherein each block has 64 pixels, and wherein the first coefficient representing the DC coefficient represents an average YUV value of other pixels in an adjacent block.

16. The method of claim 1 in a form of a machine-readable medium embodying a set of instructions that, when executed by a machine, causes the machine to perform the method of claim 1.

17. A system, comprising:
an encoding module to rearrange other coefficients representing AC coefficients of a quantized data for each block of an input data in a first fashion produces a zig-zag scan output similar to that of a non-data-partitioned data; and
a decoder module to rearrange other coefficients representing AC coefficients of an quantized data for each block of the encoded data in a second fashion produces an inverse-zig-zag scan output similar to that of the non-data-partitioned data;
wherein a forced path is used when the data is partitioned which is a same path as that of a non-standard path when non-data-partitioning is used, such that the non-standard path is used as an alternative to a DC decoding module of a standard path when data is non-data-partitioned.

* * * * *